United States Patent [19]
Dupre

[11] Patent Number: 5,908,156
[45] Date of Patent: Jun. 1, 1999

[54] SNOW MAKING TOWER WITH WIND VANE POSITIONING

[76] Inventor: Herman K. Dupre, c/o Seven Springs, Champion, Pa. 15622

[21] Appl. No.: 09/009,347

[22] Filed: Jan. 20, 1998

[51] Int. Cl.$^6$ ...................................................... F25C 3/04
[52] U.S. Cl. ........................................ 239/14.2; 73/170.05
[58] Field of Search .................................. 239/14.2, 276; 73/170.05

[56] References Cited

U.S. PATENT DOCUMENTS 5,360,163  11/1994  Dupre ...................................... 239/14.2

*Primary Examiner*—Lesley D. Morris
*Attorney, Agent, or Firm*—Carothers & Carothers

[57] ABSTRACT

The snow making tower of the present invention includes a vertical ground support pole having its bottom end anchored in the ground surface on a ski slope and a tower support sleeve is coaxially received over the upper end of this ground support pole for free axial rotation on the support pole. An elongated pipe snow making tower with snow making nozzles adjacent its upper end and water and air inlets at its lower end is secured adjacent its lower end to the tower support sleeve at a vertical incline. The elongated pipe tower, together with the support sleeve, are permitted to freely coaxially rotate on the ground support pole. A vertical wind vane is secured to the tower for turning the tower with the tower support sleeve on the ground support pole with prevailing ambient wind applied to the wind vane so that the vertical incline of the tower always points down wind.

10 Claims, 3 Drawing Sheets

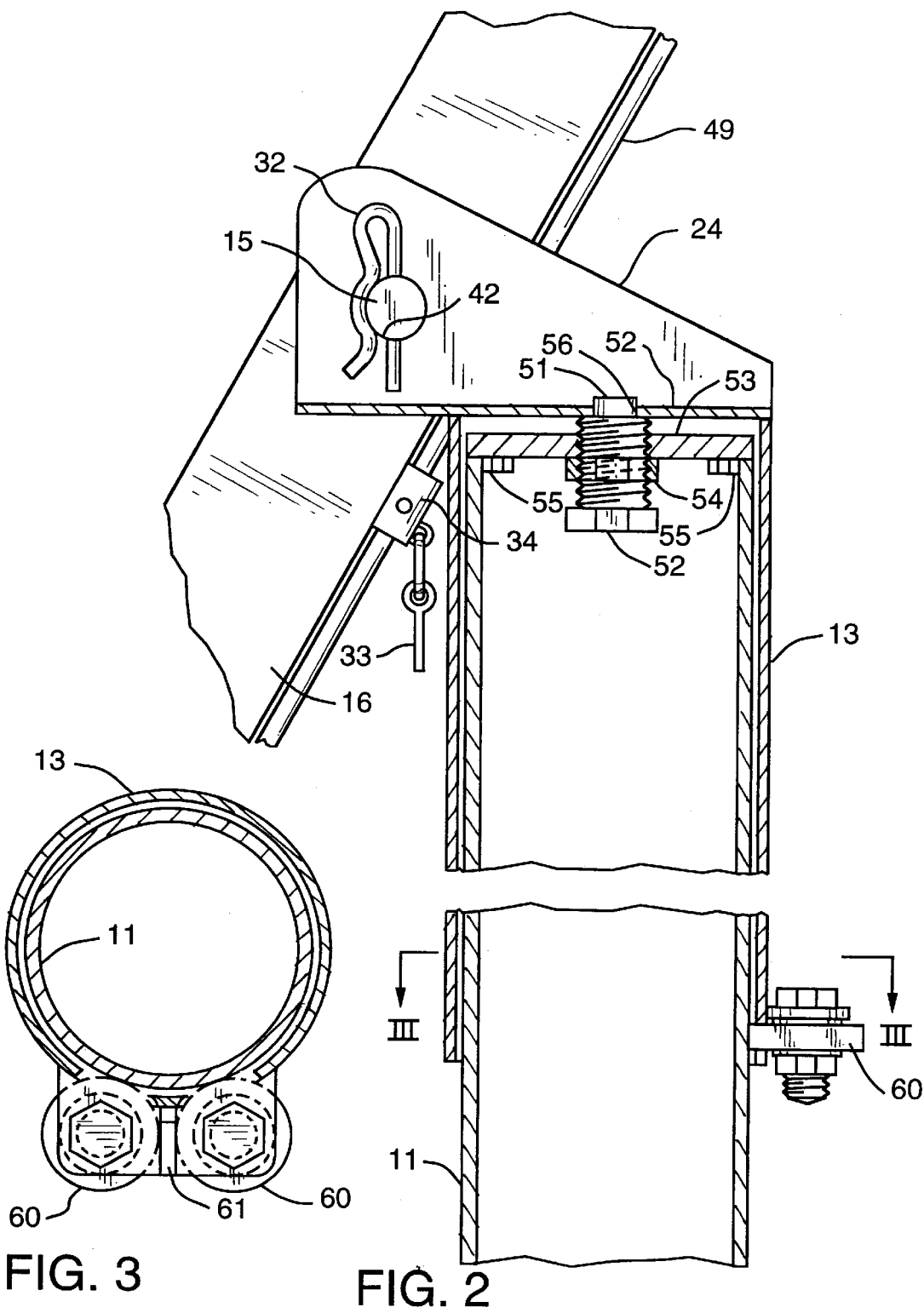

SNOW MAKING TOWER WITH WIND VANE POSITIONING

BACKGROUND OF THE INVENTION

This invention relates generally to the art of fluid sprinkling and more particularly to snow making towers for ski slopes.

The present invention pertains to improvements in snow making towers of the type disclosed in my U.S. Pat. No. 5,360,163, issued Nov. 1, 1994, for ADJUSTABLE SNOW MAKING TOWER. This patent discloses an adjustable snow making tower which includes a vertical ground support pole that is anchored into the ground and has a tower support pole coaxially received on this ground support pole for support of a snow tower for horizontal rotation on the ground support pole vertical axis.

While this described adjustable snow making tower is extremely easy and versatile in articulation for adjusting the snow tower to different ambient temperature and wind conditions, nevertheless, it must always be actually physically attended to to make any such modifications.

This type of snow making tower is generally referred to as an adjustable lean-out tower, and it is a principal object of the present invention to provide such a snow making tower which automatically adjusts itself appropriately for prevailing wind conditions so that maximum quality snow is manufactured and appropriately distributed on the ski slopes for changing wind conditions.

If the lean-out type tower is adjusted so that the prevailing wind is directed into the face of the tower, or against the direction of incline of the tower, the wind will cause the snow being manufactured to blow back against the base of the tower where it has no benefit for the underlying ski slopes and can possibly cause unwanted accumulation of ice on the tower structure.

SUMMARY OF THE INVENTION

The snow making tower of the present invention includes a vertical ground support pole with its bottom end anchored into the ground surface of the ski slopes. A tower support sleeve is coaxially received over the upper end of this ground support pole for free axial rotation thereon about a vertical coaxial axis.

An elongated pipe snow making tower is provided, with snow making nozzles adjacent its upper end and water and air inlets at its lower end, for connection to respective supplies of water and air under pressure from remote sources in order to supply air and water through the elongated pipe tower and through the nozzles at the upper end to manufacture snow in sub-freezing ambient conditions.

The elongated pipe tower is secured adjacent its lower end to the upper end of this tower support sleeve and is positioned at a vertical incline for axial rotation with the support sleeve on the underlying vertical ground support pole.

A vertical wind vane is secured to the inclined tower for turning or pivoting the tower along with its tower support sleeve on the ground support pole with prevailing ambient wind applied to the wind vane so that the vertical incline of the tower will always point down wind. Accordingly, the manufactured snow will always blow away from the tower base outwardly toward the underlying ski slopes instead of toward the immediate area surrounding the base of the tower.

Not only does this provide more desirable coverage of the snow, but this causes the air and water exiting the nozzles at the upper end of the tower to have a greater dwell time before striking the ground which creates better quality snow.

The wind vane itself is pivoted for rotation on a horizontal axis and further includes a releasable catch for releasibly securing the wind vane in its vertical position. Thus if use of the wind vane is not desirable, the catch is released and the wind vane is permitted to freely rotate about its horizontal axis and is therefore rendered ineffective as a wind vane.

The wind vane horizontal axis upon which the wind vane rotates is preferably positioned above the center of gravity of the wind vane. This arrangement causes the wind vane to position itself vertical unless acted upon by winds or otherwise retained by the releasable catch.

The releasable catch is comprised of a removable duel tined clevis which straddles a peripheral edge of the wind vane for holding it vertical. When it is desired not to utilize the wind vane features of the snow making tower of the present invention, the clevis releasable catch may be readily removed or moved to permit the wind vane to freely rotate on its horizontal axis.

In order to permit the snow making tower to rotate more freely on the ground support pole, a bearing is provided between the upper end of the ground support pole and an upper end closure for the overlying tower support sleeve. This bearing has a central bearing support extending upwardly from the upper end of the ground support pole, and this bearing support engages the upper end closure for the tower support sleeve thereby providing central bearing support of the sleeve and tower on the ground support pole. This bearing pin is preferably brass and the closure for the upper end of the sleeve is made of steel as the softer brass provides a good bearing surface against the steel.

The bearing support is preferably comprised of a brass nut threadably secured to a threaded vertical shaft which is centrally secured to the upper end of the ground support pole and which further penetrates a central passage with clearance through the upper end closure for the tower support sleeve. Accordingly, the brass nut acts as a bearing support upon which the upper end closure for the tower support sleeve is centrally supported and freely rotates. An additional nut may be threadably secured to this threaded shaft underneath the upper end of the ground support pole and an additional brass nut may be threadably secured to the threaded shaft on top of the upper end closure for the tower support sleeve in order to retain all bearing parts in a secure and fixed relationship.

With this bearing arrangement, it is also preferable to provide at least one bearing wheel secured to the lower end of the tower support sleeve such that this bearing wheel engages the ground support pole. The bearing wheel is positioned on the sleeve directly under the inclined tower, in the direction of incline of the tower, for thereby preventing the sleeve from directly engaging and binding against the ground support pole due to the large cantilevered weight of the inclined tower which overhangs its support sleeve.

As a preferred alternative to this bearing wheel, a plastic bearing sheet, such as a sheet of Teflon®, between the lower end of the tower support sleeve and the ground support pole under the tower in the direction of its incline for thereby preventing the sleeve from directly engaging the ground support pole to thereby provide as free a rotation as possible on the central brass bearing support.

An adjustable stop is also provided on the tower support sleeve for selectively securing the sleeve to the ground support pole to prevent relative axial rotation therebetween on the bearing when desired.

BRIEF DESCRIPTION OF THE DRAWINGS

Other objects and advantages appear in the following description and claims. The accompanying drawings show, for the purpose of exemplification, without limiting the invention or claims thereto, certain practical embodiments illustrating the principals of this invention wherein:

FIG. 2 is an enlarged view of the lower middle support section of the snow making tower shown in FIG. 1 with upper and lower portions removed and with the ground support pole and coaxially overlying tower support sleeve shown in vertical mid cross section;

FIG. 3 is a plan view of the lower middle support section shown in FIG. 2 as seen along section line III—III.

DETAILED DESCRIPTION OF A PREFERRED EMBODIMENT

Figure 1:
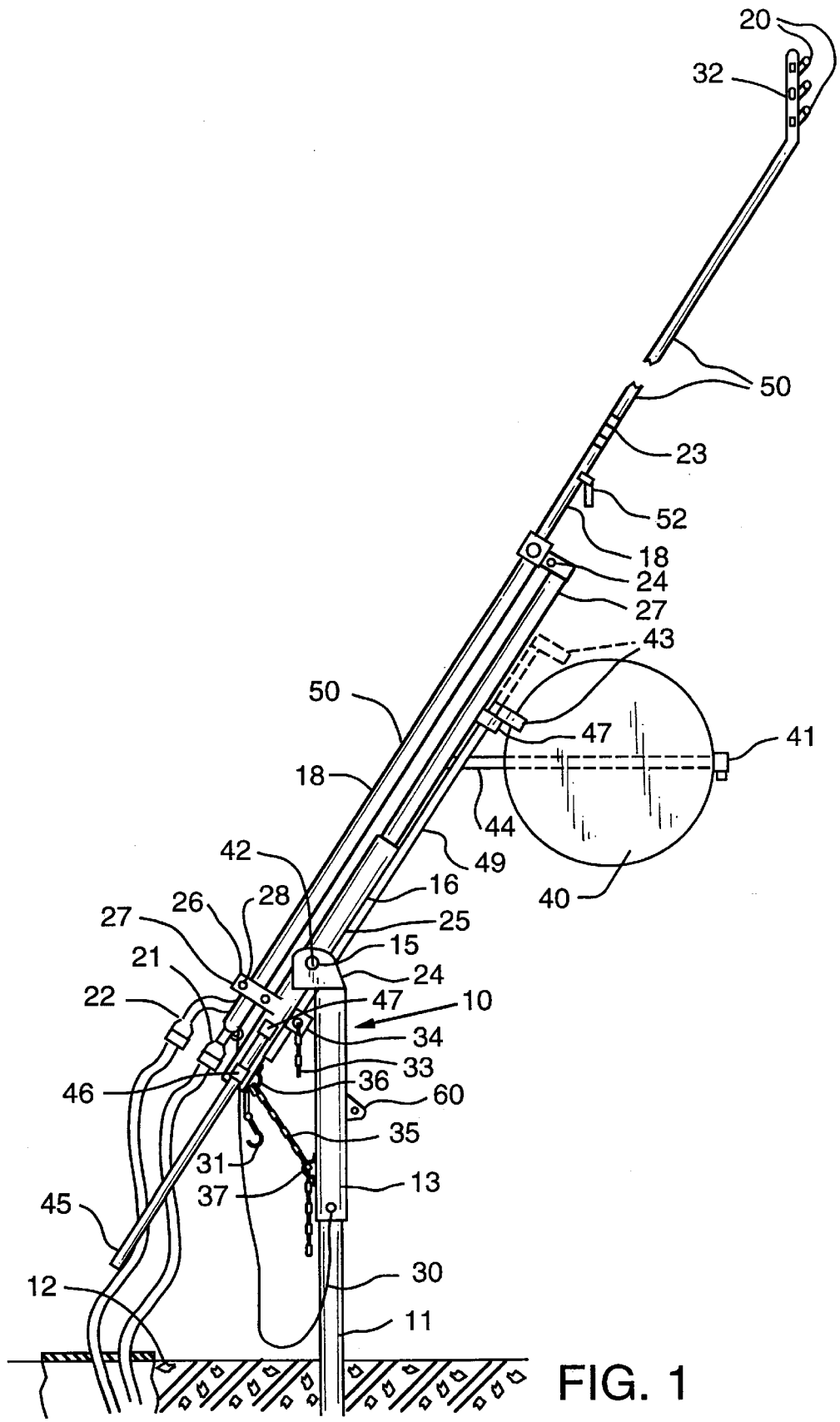
FIG. 1 is a schematic view in side elevation of the snow making tower of the present invention.

Referring to FIG. 1, the snow making tower 10 of the present invention includes a substantially vertical ground support pole 11 having the bottom end thereof anchored into ground surface 12. Tower support sleeve 13 is coaxially mounted on ground support pole 11 for support thereon and free axial rotation thereon for a full 360°.

Upwardly extending support arm 16 is pivotally supported intermediate its ends to the upper end of tower support sleeve 13 at pivotal connection 24 for pivotal movement substantially from horizontal to vertical.

Elongated pipe snow making tower 18 is provided with snow making nozzles 20 adjacent the upper end of the tower at upper portion 19 and respective water and air connections 22 and 21 are provided at the lower end of tower 18 for connection to remote sources of air and water under pressure through the hoses depicted for supply to the nozzles 20 for ultimate discharge into ambient atmosphere for manufacturing snow in subfreezing conditions in a known fashion.

The elongated pipe snow making tower 18 itself is also pivotally secured intermediate its ends to the upper end of support arm 16 at pivotal connection 24 for movement in a vertical plane from parallel alignment with support arm 16 to positions below horizontal so that one may readily access the nozzles 20 from the ground for repair or exchange.

The support arm 16 vertically supports tower 18 at any desirable angle. However, tower 18 is preferably supported at 10° to 30° relative to vertical.

Tower 18 is formed in two pipe sections 50 coupled with coupling 23.

Due to the length of tower 18, it will bow somewhat or sag and to compensate for this one may need to raise the tower closer to 10°. Also, in higher subfreezing ambient temperature conditions, it is also desirable to bring the tower 18 to an angle of 10° relative to vertical in order to provide more loft. This greater loft provides more dwell time for the atomized water crystals to form snow while falling to the underlying ski slope.

The support arm 16 is constructed in two pieces with a lower metal base support sleeve 25 and a longer support tube 27 having its bottom end coaxially and slidably received in telescoping fashion in the upper end of bottom sleeve 25 for removable support.

A securing device or retainer 26 is provided at the base portion of tower 18 for securing the base portion of tower 18 in parallel alignment with support arm 16. This securing device may be easily released by removing an upper pin 28 from spaced ears 27 to permit the tower 18 to rotate clockwise about pivot 24 at the upper end of support arm 16.

A pull cord or line 30 is connected between the bottom end of tower 18 and the bottom end of tower support sleeve 13. Line 30 may be of any flexible line such as a rope and its length is limited so that as tower 18 rotates clockwise pull line 30 will be stretched to its maximum length when the tower 18 is in its down position so that the operator may have access to the nozzles 20 from the ground surface 12 for easy replacement or repair access.

When maintenance has been accomplished and one wants to raise tower 18 once again to its operating position, the operator merely pulls on pull line 30 to bring tower 18 back into parallel alignment with support arm 16. At this point, snap pin 28 of retainer 26 is reinserted between ears 27 of retainer 26 to secure tower 18 in this aligned position with support arm 16.

A retainer line in the form of chain 35, is adjustable in length or in its point of connection between the lower end of support arm 16 at 36 on the tower support sleeve 13 at 37 for retaining pipe tower 18 together with its support arm 16 at the desired angle relative to vertical.

As stated, retainer line 35 may be a chain and a retainer clip (not shown) may be provided for adjusting the point of connection of chain 35 to tower support sleeve 13 to provide the adjustability required.

Figure 4:
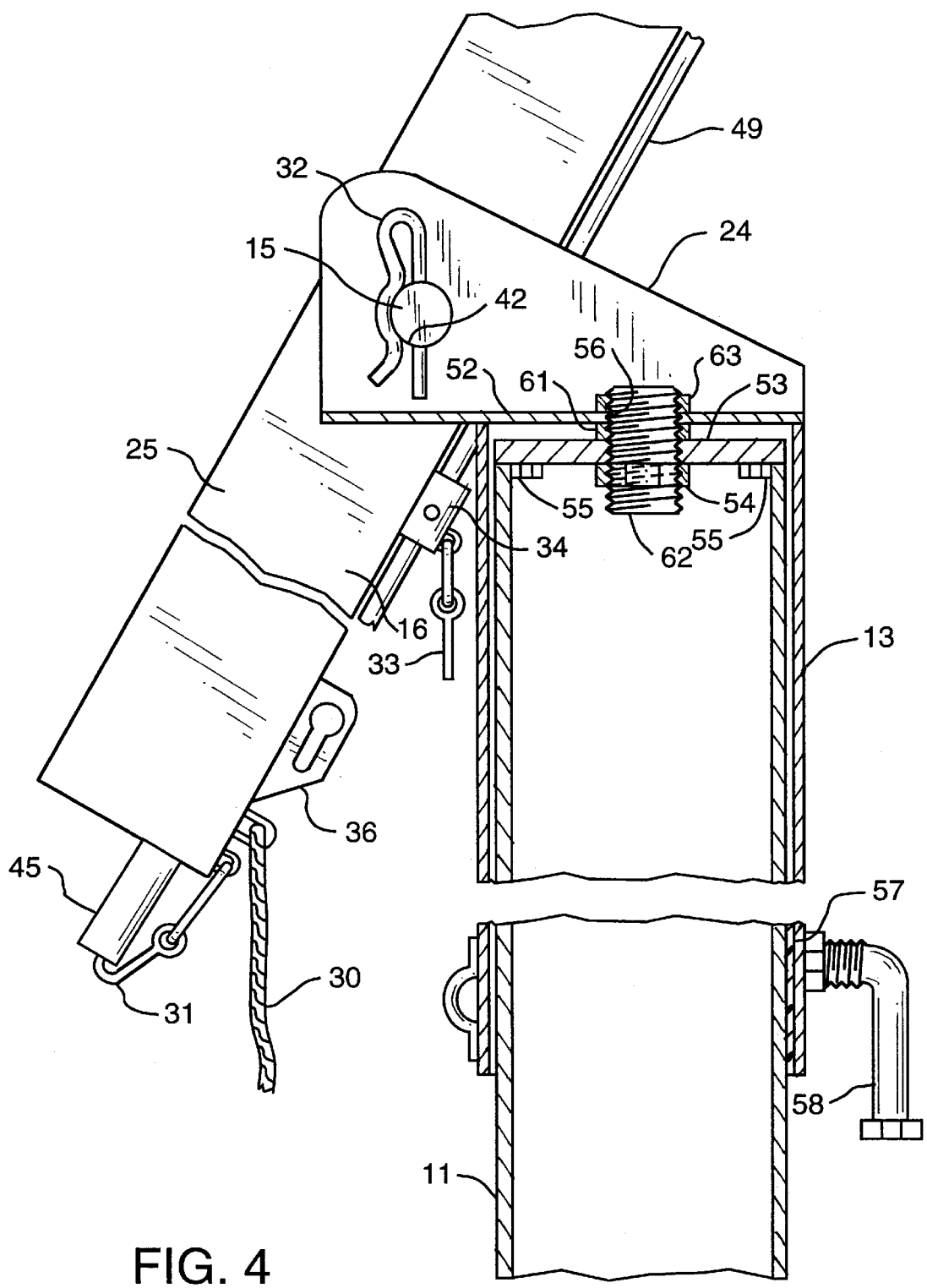
FIG. 4 is an enlarged view of the lower middle support section of the snow making tower shown in FIG. 1 with upper and lower portions removed and with the ground support pole and coaxially overlying tower support sleeve shown in vertical mid cross section showing an alternative of the bearing structure illustrated in FIG. 3

A leverage arm 45 is a free section of pipe received up into the lower hollow end of support arm 16 and it depends therefrom for grasping to assist in vertically pivoting of the support arm 16, with pipe tower 18, to a desired vertical position. In so manipulating support arm 16 with leverage arm 45, elongated pipe tower 18 may be connected or disconnected at securing device or retainer 26 as desired. Arm 45 may be fully stored up in support arm 16 and there retained by end hook 31 as is best illustrated in FIG. 4.

The pivotal connections 24 of support arm 16 to the upper end of support pole 13 is offset to the side of tower support sleeve 13. This permits the tower and support arm to be raised to full vertical and also permits ease of rotating the entire unit about ground support sleeve pole 11, as will be explained in more detail hereinafter.

This support arm pivotal connection includes two spaced vertical side plates or ears 24a which are provided with upwardly facing and open spaced pivot openings or passages 42 receiving pivot pin 15, which is a headed pin that is transversely received through the lower base support sleeve 25 such that opposite ends thereof are exposed on opposite sides of the support arm 16 with the exposed ends respectively received in spaced bearing passages 42. A retaining clip 32 is provided to prevent pin 15 from dislodging out of passages 42.

In addition, a drip catch mechanism 64 is also provided on the tower structure to prevent water running down the tower 18 from dripping on to the support arm 16.

For details of the nozzle operation and the specifics for the construction of the tower 18 itself, reference should be had to co-pending U.S. patent application Ser. No. 08/911,240, filed on Aug. 15, 1997, for Snow Making Tower and now U.S. Pat. No. 5,890,654.

Referring specifically to FIG. 1, vertical wind vane 40, which is provided in the shape of a disk, is secured to tower support arm 16 for turning tower 18 with its connected support sleeve 13 on ground support pole 11 with prevailing ambient wind applied to the wind vane 40, whereby the vertical incline of the tower depicted in FIG. 1 always points down wind.

Wind vane 40 is pivoted for rotation on horizontal axis 41 of horizontal support bar 44 that is rigidly secured to support tube 27 of support arm 16. Axis 41 is positioned above the center of gravity of vane 40 so that it will rest in a vertical position as shown when an ambient cross wind is not applied to it.

A releasable catch 43 is provided at an upper peripheral edge of wind vane 40 and is supported from rigid support sleeve 49, which is also slidably secured to support arm 16. Releasable catch 43 is a dual tined clevis which straddles the peripheral edge of wind vane 40 and thereby holds it in its vertical position as illustrated in FIG. 1. This catch 43 may be reached from the ground by an operator with long pole 49 which is slidably pushed upward through sleeves 47, as illustrated by the broken outline, and there retained by inserting locking pin 33 in locking hole 34 of lower sleeve 47. Catch 43 is thus released and thereby permits wind vane 40 to freely rotate about axis 41. This renders wind vane 40 essentially ineffective when its use is not desired.

Referring to FIG. 2, a central brass bearing support in the form of pin 51 is machined on the end of brass machine bolt 52 and extends upwardly from the upper end of disk 53 of ground support pole 11. Bolt 52 is threadably received in upper end of the steel disk 53 and retained in position by brass lock nut 54.

Disk 53 is centrally retained in the upper end of ground support pole or pipe 11 by means of guiding projections 55 which are welded to the underside of disk 53 to maintain disk 53 in a centrally located position on the top of pipe 11 as illustrated.

Support ears or plates 24a are welded to the upper end of our support sleeve 13 and a bearing support opening 56 is provided in closure plate 24b of pivotal connection 24 to matingly receive bearing pin 51 in order to centrally support the entire tower, together with its support arm 16 and pivotal connection 24 together with tower support sleeve 13, on bearing support pin 51 so that the entire tower structure may very easily and freely rotate about ground support pole 11.

Bearing wheels 60 are mounted for rotation about their central vertical axes on a support plate 61 which is secured or welded to the lower end of tower support sleeve 13 such that the outer perimeter of bearing wheels 60 engage ground support pole 11 as illustrated in FIGS. 2 and 3. Bearing wheels 60 are positioned on sleeve 13 directly under tower 18 and support arm 16 in the direction of their incline thereby preventing sleeve 13 from ever directly engaging or bearing directly against support pole 11, so that sleeve 13 cannot bind on or rub against support pole 11 due to the large leveraged overhang of tower 18. Accordingly, central bearing pin 51 and bearing rollers 60 provide very easy axial rotation of the tower 18, together with support sleeve 13, on the upper end of support pole 11 so that wind vane 40 may readily or easily rotate tower 18 with applied ambient winds, even with low wind conditions.

Referring next to FIG. 4, a variation embodiment is illustrated for the central bearing support provided between the upper end closure or disk 53 of ground support pole 11 and the upper end closure plate 24b of power support sleeve 13, which end closure plate 24b is part and parcel and forms the base of pivotal connection 24. Identical elements are designated with the same reference numerals of FIG. 2.

In this embodiment, the support bearing is comprised of a brass nut 61 that is threadably secured to threaded vertical shaft 62. Shaft 62 is centrally secured to the upper end closure 53 of ground support pole 11. In fact, threaded shaft 62 is threadably received or engaged with a central passage in upper end closure 53 and lock nut 54 is thereunder tightly secured against the underside of end 53 and is threadably received on threaded shaft 62.

Brass bearing nut 61 is then threadably received on the upper end of threaded shaft 62 and threaded downwardly thereon to engage the upper face of end closure 53 for support pole 11. The remaining upper portion of threaded shaft 62 then penetrates through central passage 56 of closure plate 24b with clearance so that there is no binding or threaded engagement therebetween and the upper end of threaded shaft 62 is provided with a brass bearing lock nut 63 which is threadably engaged with shaft 62 and engages the upper surface of end closure plate 24b of tower support sleeve 13.

This arrangement provides a much less expensive and stronger bearing support for supporting the entire tower 10 on tower support sleeve 13 for vertical axial bearing rotation on the upper end closure 53 of ground support pole 11 than is illustrated in the embodiment shown in FIGS. 2 and 3.

Instead of utilizing the bearing wheels 60 as illustrated in FIGS. 2 and 3, the embodiment illustrated in FIG. 4 substitutes therefore a plastic bearing sheet 57, preferably formed of Teflon®, which is disposed between the lower end of sleeve 13 and ground support pole 11. Bearing sheet 57 is again positioned under the tower in the direction of incline of the tower as illustrated in the figures for thereby preventing the bottom inside of sleeve 13 from directly engaging and grinding against support pole 11.

An adjustable stop 58 in the form of an L-shaped handle is threadably received through sleeve 13 and may be threaded inwardly to engage the outside of support pole 11 for selectively securing the sleeve to the ground support pole to prevent relative axial rotation therebetween on the support bearing provided by brass bearing support nut 61.

Stop 58 also assists in holding Teflon® sheet 57 in position as it penetrates through an opening through this sheet 57. Other appropriate methods may be utilized to hold sheet 57 in position by, for example, peening over bottom edges or tines or tongues extending downwardly from the bottom edge of sleeve 13.

I claim:

1. A snow making tower including a vertical ground support pole having bottom and upper ends with said bottom end anchored in a ground surface, a tower support sleeve coaxially received over the upper end of said ground support pole for free axial rotation thereon, and an elongated pipe snow making tower having upper and lower ends with snow making nozzles adjacent the upper end and water and air inlets at the lower end thereof for connection to respective supplies of water and air under pressure from remote sources for ejection through said nozzles to manufacture snow in subfreezing ambient conditions; said tower secured adjacent its lower end to the upper end of said tower support sleeve at a vertical incline for axial rotation therewith on said ground support pole; the improvement comprising a vertical wind vane secured to said tower for turning said tower with said tower support sleeve on said ground support pole with prevailing ambient wind applied to said wind vane whereby the vertical incline of said tower points downwind.

2. The snow making tower of claim 1 wherein said wind vane is pivoted for rotation on a horizontal axis and further includes a releasable catch for releasably securing said vane in its vertical position.

3. The snow making tower of claim 2 wherein said wind vane horizontal axis is positioned above the center of gravity of said wind vane.

4. The snow making tower of claim 3, said releasable catch comprised of a removable dual tined clevis which straddles a peripheral edge of said wind vane for holding it vertical.

5. The snow making tower of claim 1, said tower support sleeve having upper and lower ends and coaxially received over said ground support pole and including a bearing between the upper end of said ground support pole and an upper end closure for said tower support sleeve, said bearing comprised of a central support bearing extending upwardly from the upper end of said ground support pole and engaging an underside of said closure for central bearing support thereon of said sleeve and tower.

6. The snow making tower of claim 5 wherein said bearing is brass and said closure is steel.

7. The snow making tower of claim 6, said bearing comprised of a brass nut threadably secured to a threaded vertical shaft which is centrally secured to the upper end of said ground support pole and penetrates a central passage with clearance through said upper end closure for said tower support sleeve.

8. The snow making tower of claim 5 including at least one bearing wheel secured to the lower end of said sleeve and engaging said ground support pole, said bearing wheel positioned on said sleeve under said tower in the direction of incline of the tower for thereby preventing said sleeve from directly engaging said ground support pole.

9. The snow making tower of claim 5 including a plastic bearing sheet disposed between the lower end of said sleeve and said ground support pole under said tower in the direction of incline of the tower for thereby preventing said sleeve from directly engaging said ground support pole.

10. The snow making tower of claim 5 including an adjustable stop on said sleeve for selectively securing said sleeve to said ground support pole to prevent relative axial rotation therebetween on said bearing.

* * * * *